(12) United States Patent
Khbeis et al.

(10) Patent No.: US 10,922,503 B2
(45) Date of Patent: Feb. 16, 2021

(54) MULTI FREQUENCY SIGNATURES USING NANO/MICROSCALE THREE DIMENSIONAL PRINTED STRUCTURES

(71) Applicant: LOCATORX, INC., Jacksonville, FL (US)

(72) Inventors: Michael T. Khbeis, Federal Way, WA (US); William D. Meadow, Jacksonville, FL (US)

(73) Assignee: LOCATORX, INC., Jacksonville, FL (US)

( * ) Notice: Subject to any disclaimer, the term of this patent is extended or adjusted under 35 U.S.C. 154(b) by 72 days.

(21) Appl. No.: 16/196,848

(22) Filed: Nov. 20, 2018

(65) Prior Publication Data
US 2019/0156083 A1   May 23, 2019

Related U.S. Application Data

(60) Provisional application No. 62/588,733, filed on Nov. 20, 2017.

(51) Int. Cl.
| | | |
|---|---|---|
| *G06K 7/10* | (2006.01) | |
| *H01P 7/08* | (2006.01) | |
| *H01P 11/00* | (2006.01) | |
| *G06K 19/07* | (2006.01) | |
| *G06K 19/06* | (2006.01) | |
| *G06K 19/067* | (2006.01) | |

(Continued)

(52) U.S. Cl.
CPC ... *G06K 7/10366* (2013.01); *G06K 19/06037* (2013.01); *G06K 19/0672* (2013.01); *G06K 19/0723* (2013.01); *H01P 7/082* (2013.01); *H01P 11/008* (2013.01); *H01Q 1/2216* (2013.01); *H01Q 13/206* (2013.01); *H01Q 21/068* (2013.01)

(58) Field of Classification Search
CPC .. G06K 7/10366; G06K 7/0723; H01P 7/082; H01P 11/008; H01Q 1/2216; H01Q 13/206; H01Q 21/068
See application file for complete search history.

(56) References Cited

U.S. PATENT DOCUMENTS

| | | | |
|---|---|---|---|
| 2007/0096919 A1* | 5/2007 | Knadle, Jr. | .......... H01Q 1/2216 340/572.8 |
| 2013/0015248 A1* | 1/2013 | Perret | ................ G06K 19/0672 235/492 |

(Continued)

OTHER PUBLICATIONS

Charting Conductor Profile Effects on Stripline, Microwave J. (Aug. 2012) http://www.microwavejournal.com/blogs/1-rog-blog/post/18121-charting-conductor-profile-effects-on-stripline.

(Continued)

*Primary Examiner* — Laura A Gudorf
(74) *Attorney, Agent, or Firm* — Morris, Manning & Martin, LLP; Daniel E. Sineway, Esq.; Adam J. Thompson, Esq.

(57) ABSTRACT

The present invention provides a series of structures that provide a unique electromagnetic signature that can be used as a standalone device or as part of a larger security system. This structure's design method of manufacturing ensures that is resilient to commonly used techniques for reverse engineering electronic components and counterfeiting and is able to be applied to devices or any product before or after fabrication is completed.

20 Claims, 3 Drawing Sheets

(51) Int. Cl.
    *H01Q 21/06*     (2006.01)
    *H01Q 1/22*     (2006.01)
    *H01Q 13/20*     (2006.01)

(56) References Cited

U.S. PATENT DOCUMENTS

| | | | |
|---|---|---|---|
| 2015/0069133 A1* | 3/2015 | Qian | H01Q 1/36 235/492 |
| 2018/0121689 A1* | 5/2018 | Tehranipoor | G07D 7/004 |

OTHER PUBLICATIONS

I. Jalaly and I.D. Robertson, RF Barcodes Using Multiple Frequency Bands, IEEE Microwave Symposium (Jul. 2005).
Marta Krawczyk, Microstrip Resonators for Circuit Quantum Electrodynamics, Technische Universität München (Dec. 2011), https://www.wmi.badw.de/publications/theses/Krawczyk_Master_Thesis_2011.pdf.

* cited by examiner

MULTI FREQUENCY SIGNATURES USING NANO/MICROSCALE THREE DIMENSIONAL PRINTED STRUCTURES

CROSS REFERENCE TO RELATED APPLICATIONS

This application claims priority to U.S. Provisional Patent Application No. 62/588,733, filed Nov. 20, 2017, and entitled "Radio Frequency Signatures Using Nano/Microscale Three Dimensional Printed Structures."

FIELD OF THE DISCLOSURE

The present disclosure relates to methods, apparatus and devices for providing secure identification and protecting information using multiple microstrip resonators. More specifically, the present invention includes methods and automation used in manufacture of devices with multiple microstrip resonators, as well as methods and apparatus for interrogating the multiple microstrip resonators and processing interrogated information.

BACKGROUND OF THE DISCLOSURE

Counterfeit, stolen and diverted/gray market components and goods cost the economy approximately one dollar per day for every person on earth. Counterfeit goods adversely impact brand reputations, hurt consumers, cause critical system failures, and fuel organized crime. Sophisticated counterfeiting techniques include unauthorized production overruns on the gray market from authorized contract manufacturers, full device reverse engineering and reproduction in unauthorized factories, supply chain interdiction, as well as parts recycling and remarking.

Radio Frequency (RF) Barcodes have been known using multiple frequency bands, such as those described in the volume: I. Jalaly and I. D. Robertson, *RF Barcodes Using Multiple Frequency Bands*, IEEE MICROWAVE SYMPOSIUM (July 2005); and conductor effects on stripline have been studied, such as the processes described in *Charting Conductor Profile Effects On Stripline*, MICROWAVE J. (August 2012), as well as Marta Krawczyk, *Microstrip Resonators for Circuit Quantum Electrodynamics*, TECHNISCHE UNIVERSITÄT MÜNCHEN (December 2011), https://www.wmi.badw.de/publications/theses/Krawczyk_Master_Thesis_2011.pdf.

Microstrip transmission lines are known in the art. Microstrips are planar transmission lines comprising a conducting strip and a ground plane separated by a dielectric (the conducting strip and the ground plane may be interchangeable according to the present disclosure; accordingly, as used herein, the conducting strip may be referred to simply as a second ground plane). Transmission lines are structures that transmit electromagnetic waves at radio frequencies (typically 3.00 kHz-300 GHz). Microstrip resonators are capable of storing energy and converting magnetic energy to and from electric energy.

SUMMARY OF THE DISCLOSURE

Accordingly, the present invention provides methods, apparatus and devices to address counterfeit components and goods and thereby address a massive economic problem plaguing multiple industries around the world. The present invention provides a series of structures with microstrip resonators. In this invention disclosure, a microstrip resonator is defined as any manmade structure, generally referred to as a waveguide, which can propagate and/or reflect electromagnetic radiation. Electromagnetic radiation, while typically referring to radio frequency electromagnetic waves, can be any frequency of the electromagnetic spectrum that will facilitate transmitting and receiving signals. Devices with microstrip resonators allow for a unique electronic signature (for example a new type of radio frequency identification (RFID) tag) or other marking that is resistant to tampering or counterfeiting. In some embodiments, information is included in the microstrip resonators that is similar to information contained in a barcode. The information may therefore be included in a "tag" that can be used as a standalone device or as part of a larger security system. In other aspects, information encoded in the microstrip resonators may include almost any information that a manufacturer desires to be encoded.

The devices and methods of manufacturing described herein provide a uniquely engineered and fabricated structure that cannot be reverse engineered using traditional techniques and can be applied after wafer/device manufacturing and thus are well protected from discovery or tampering. This ensures that entities can apply a digital signature to their authorized products without relying on the integrity of their foreign or uncontrolled or unregulated contract manufacturers. This signature can also be used as part of a larger system that tracks and ensures the integrity of authentic products throughout the full supply chain distribution and transportation channels, thereby disrupting supply chain interdiction at all levels of possible compromise.

In some specific embodiments, information encoded (intentionally patterned) in microstrip resonators may be matched to a security key system, such as a Public Key Infrastructure (PKI) system or other secure data matching or encrypting/decrypting system such that a potential user must be able to fulfill challenges incorporating "have something/know something" processes, wherein the present invention provides a high degree of reliability that a "have something" component is a genuine article. Other embodiments allow for simple and reliable determination of an identification of an item to which the microstrip resonators are fixed to or made a part thereof.

In another aspect, methods of manufacturing of the disclosed structure designs ensure that a device made according to the present invention is resilient to commonly used techniques for reverse engineering and counterfeiting electronics and other high value commodities and is able to be applied to devices after existing fabrication is completed.

BRIEF DESCRIPTION OF THE DRAWINGS

The accompanying drawings, that are incorporated in and constitute a part of this specification, illustrate some embodiments of the disclosure and, together with the description, serves to explain the principles of the disclosure.

Figure 1:
FIG. 1 illustrates a 3D patterned resonator with a side view of a microstrip resonator.
Figure 1:
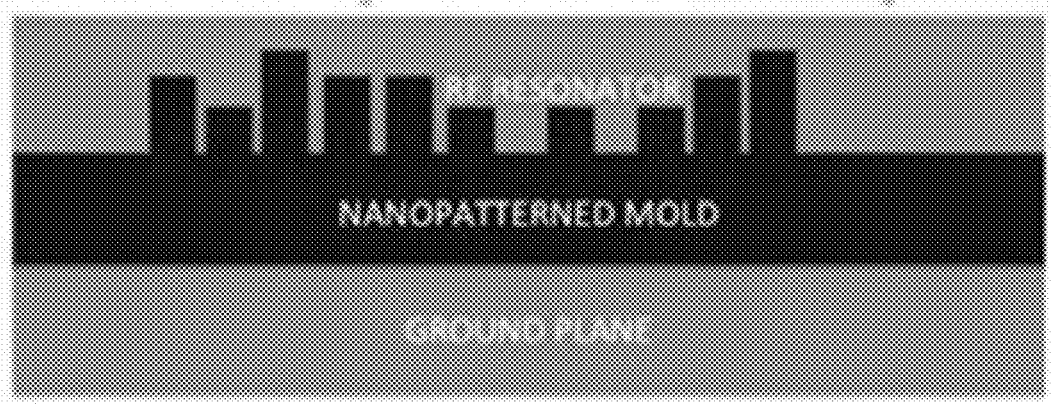

In the following sections, detailed descriptions of examples and methods of the disclosure will be given. The description of both preferred and alternative examples though through are exemplary only, and it is understood that to those skilled in the art that variations, modifications, and alterations may be apparent. It is therefore to be understood that the examples do not limit the broadness of the aspects of the underlying disclosure as defined by the claims.

DETAILED DESCRIPTION

The present disclosure provides generally for (1) intentional patterning, generally at the nanometer or micrometer scale, of unique resonator tags or other information on a substrate, (2) protecting goods using a post-manufacturing process for adding microstrip resonators to existing products such as wafers. Methods and apparatus are described for the manufacture of devices with multiple (3) microstrip resonators or similar electromagnetic waveguides, generally at radio frequencies, as well as (4) descriptions of methods and apparatus for interrogating multiple microstrip resonators and (5) processing interrogated information that is received back from the interrogated waveguides. In general, as described in more detail below, interrogation involves electromagnetic radiation such as radio waves that are transmitted in multiple frequencies and reflected off of multiple microstrip resonators while observing scattering and absorption of the radio frequencies reflected off of the multiple microstrip resonators. Manufacture includes formation of three dimensional ("3D") microstrip resonators or waveguides.

According to the present disclosure, we define Multi-Frequency Barcodes (MF Barcodes) that are applied to a substrate, generally using a series of machines, like, but not limited to, small scale nano/microscale 3D printers, and interrogated using some kind of electromagnetic transceiver. For example, MF Barcodes include microstrip resonators. Interrogation includes observing an S21 response to an electromagnetic radiation stimulus, and scattering and absorption to interrogate multiple barcodes at different frequencies.

MF Barcodes having multiple frequency bands applied, along with simple circuits such as a capacitor-inductor style filter, and interrogated using multiple microstrip resonators provide one of many ways to obtain analog signals that can be converted to digital values. Interrogation may include observing scattering parameters (sometimes referred to as S-Parameters) of the reflected electromagnetic signals. In general, as used herein, parameters S11 and S22 refer to reflection coefficients and S21 and S12 refer to transmission coefficients. In some embodiments, the present invention interrogates multiple microstrip resonators and monitors a S21 response. Scattering and absorption is observed to interrogate multiple barcodes at different frequencies.

Frequency response may be controlled via fine control of the width of the resonator lines, as well as the width of the transmission line, thickness of transmission line, thickness of the substrate, and doping of the substrate. The advantage is that these resonators do not require a separate integrated circuit to provide a unique identifier like common RFID tags. Standard RFID tags can easily be replicated by introducing counterfeit integrated circuits with copied codes. MF Barcodes, as previously described, can be easily replicated by physically measuring the microstrips and copying the structures to create a counterfeit MF signature.

Figure 2A:
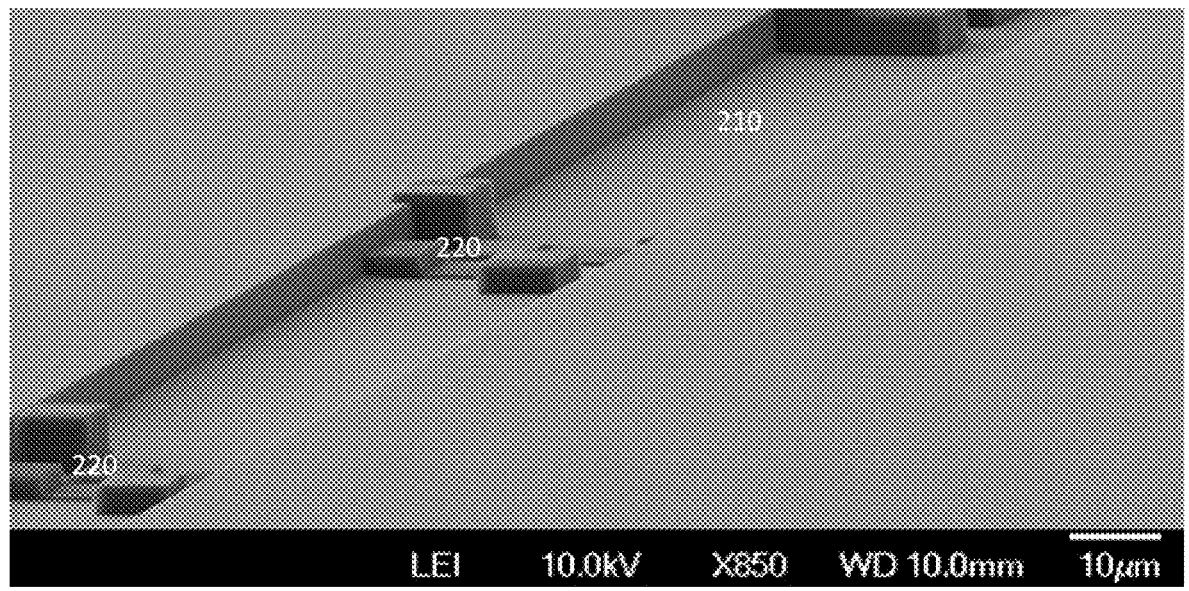
FIGS. 2A and 2B illustrate annotated photographs taken from a digital microscope of a sample three-dimensional patterned resonator.
Figure 2B:
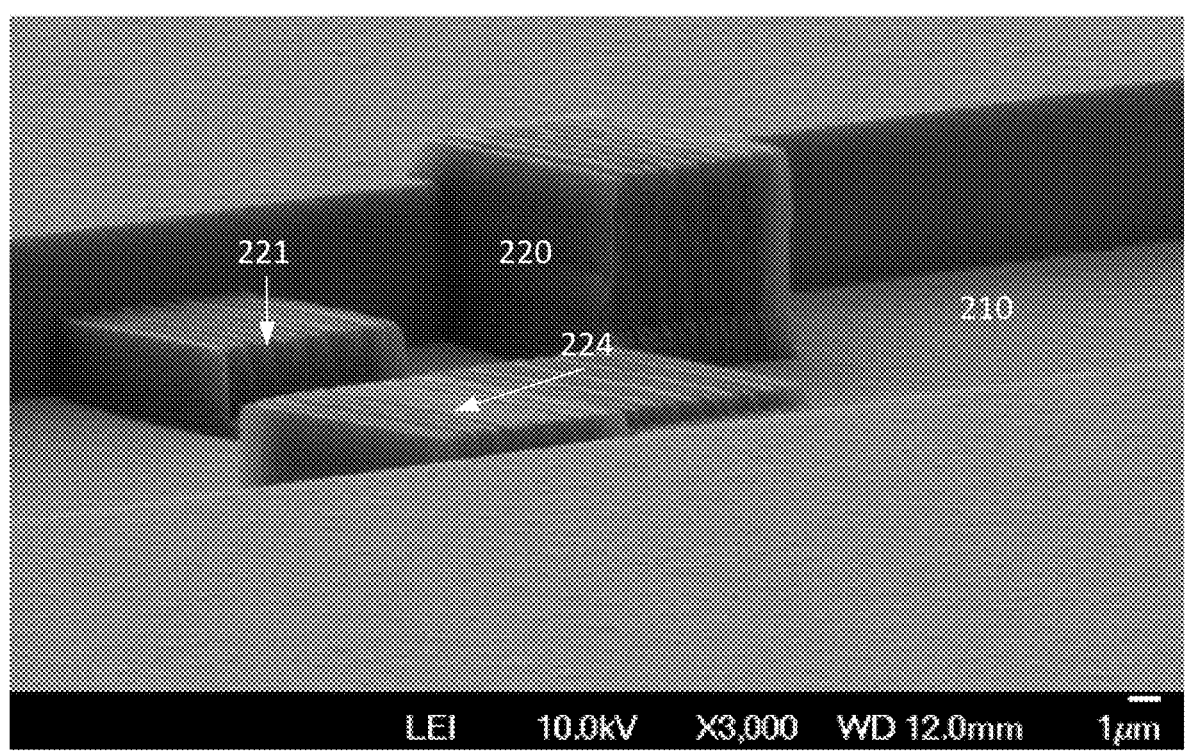
Figure 3:
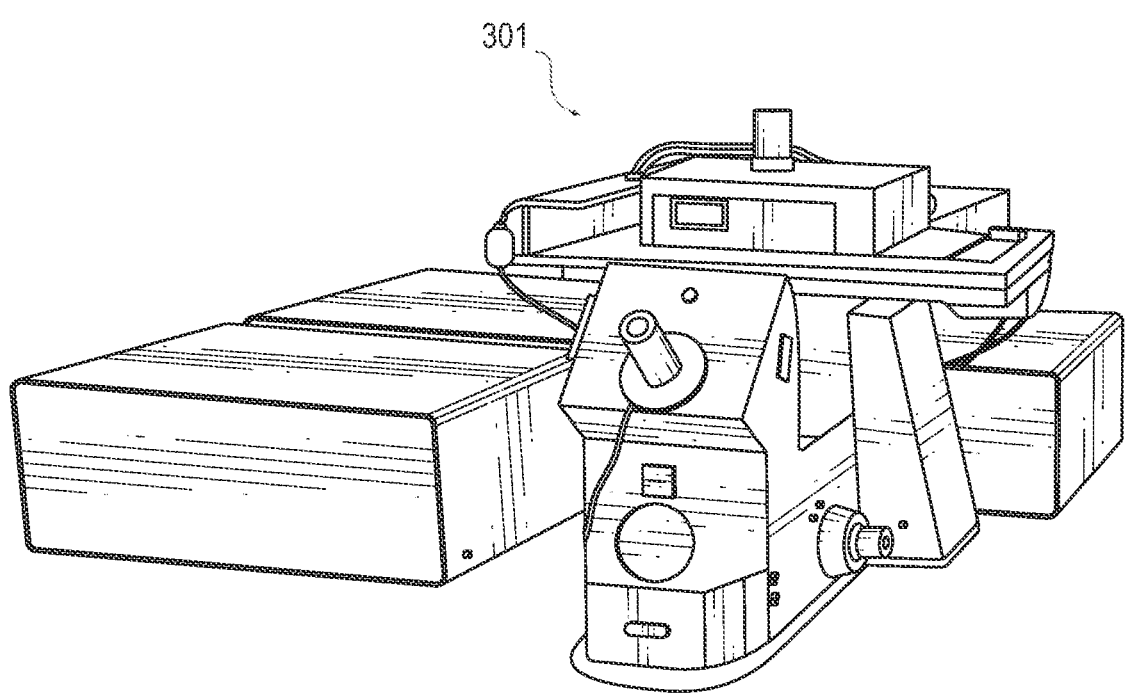
FIG. 3 illustrates a NanoScribe machine capable of creating microstrip resonators with intentional patterning.

In some aspects, the present invention includes the formation of engineered three dimensional radio frequency barcodes. These structures have been created by using a machine, such as a nanoscale 3D printer. For example, referring now to FIG. 3 a Nanoscribe 301, may be used to deposit blocks of material, (e.g. as shown in FIGS. 2A and 2B), that change the electromagnetic signals traveling through patterned waveguide. Waveguides, like microwave stripline and microstrips are susceptible to effects of copper conductor surface roughness. Microstrip performance is degraded by high values of conductor surface roughness. In a microstrip, current flows through the conductor metal and in the surrounding dielectric and air. As frequency increases, the current propagates on the surface of the conductor, so roughness on the surface increases losses of the conductor.

Similarly, a stripline, which comprises a conductor with top and bottom ground plane, will see effects of surface roughness in return current variations that also effect dielectric losses. These losses impact the S21 response of the resonator line. Waveguides, like the stripline conductor, can be interrogated with simple circuits to read signals and store digital values based on time domain, phase-domain, frequency, or any other signal response.

According to the present invention, nano/microscale roughness is intentionally induced by patterning one or more microstrip resonators to simulate unique roughness profiles to create unique signatures. The dimensions of the patterns of the MF Barcode can be created using a set of data values representing a physical manifestation of height/width/length that correlate to using numbers or code representation such as, but not limited to, Public or Private Key Pairs, or Universally Unique Identifiers (UUID), or any other desired information. This provides the capability to generate a 3-dimensional MF barcode with many unique MF signatures. Changes in the pattern will cause variations in the spectral response of the resonator that can be measured wirelessly or via contacts to bonded digital circuits and used as a Tag (for example: a set of unique values with up to $4^{10,000}$ bits in resonator with a length of up to 1 mm) that cannot be easily replicated. The MF Barcode enables signatures that will have intentional variations in amplitude and phase can be digitally recorded and can be paired with additional security components, such as an encryption engine, using traditional electronics for transmitting signals and take selective sub-sets of the reflected MF signatures for additional functional uses of the converted (analog to digital) data such as validation, expose data values, challenge response processing, validation, verification, authorizations, data discovery and authentication purposes. These features and capabilities would enable a digital private key processing system that will be incredibly difficult to replicate or spoof.

Referring now to FIG. 1, an engineered 3D patterned resonator is illustrated. A top view 101 of an MF Barcode provides a top down look at at topography present in the cross section view 102. The engineered 3D MF patterns may include microwave stripline and microstrips susceptible to effects of copper conductor surface roughness. Microstrip performance is degraded by high values of conductor surface roughness. In a microstrip, current flows through the conductor metal and in the surrounding dielectric and air. As frequency increases, the current propagates on the surface of the conductor, so roughness on the surface increases the losses of the conductor.

In some embodiments, nano/microscale roughness is intentionally induced by patterning one or more resonators to simulate unique roughness profiles to create unique signatures. Serial nano/microscale patterning can be achieved in many ways using a variety of techniques. One such example is the use of a nanoscale 3D printer, such as a Nanoscribe machine, shown in FIG. 2. This system is uses a laser with immersion optics to intentionally expose a polymer resin using a 2-photon exposure. The exposure pattern is computer controlled and can be used to create desired structures that will remain after the unexposed resin is removed in a developer solution. An example of this patterning technique has been demonstrated using barcode-like, unique structures placed within a waveguide, demonstrated in FIG. 3. Once this structure is filled or coated with metal using any one of several well-known nano/microscale manufacturing techniques, the structures will create unique signatures. The unique signatures in turn provide the capability to generate unique MF signatures that may be utilized as a 3D MF barcode with many unique MF signatures. Changes in the spectral pattern are functional to cause variations in a spectral response of a resonator that can be measured wirelessly or via contacts to bonded digital circuits and used as a tag that cannot be replicated.

In some embodiments, intentional patterning of unique resonator tags provide for the core concepts disclosed herein. Signal processing circuits measure a response profile to approximate the depth of the roughness and create a measurable value. For example, if the resolution of the apparatus that measures the depth of the roughness (e.g., a digital microscope) is 1 micron, a 6 micron wide strip may have up to 5 bits of measurement precision and different possible values.

In some embodiments, the microstrip resonator transmission line may further comprise one or more antennae and/or one or more constrictions in the line. As discussed in Krawczyk, this may also affect spectral response. Methods for creating antennae and constrictions are described in Krawczyk.

In some embodiments, a design varies in a prescribed manner for each resonator design and is mass producible with each device having a unique MF Barcode. In an exemplary embodiment, MF Barcodes are added on integrated circuit components before the final sealing and assembly processes to create a unique identifier signature for each device. This would facilitate supply chain security against counterfeiting, tampering, or other supply chain anomalies like interdiction where valid goods are exchanged for counterfeit or tampered parts. Conventional patterning techniques using conventional photolithography is not required or appropriate to create individual identifiers. A pattern may be created using a direct-write or otherwise serially alterable patterning technique that create differing patterns. Created patterns may be designed for example to represent a data value such as a private key or a defined product UUID or measured values for the individual chip to serve as a basis for precise calibration of the manufactured chip physical response characteristics. Any other information may also be represented by a data value.

Techniques may include for example, but not limited to, grayscale direct-write electron-beam or laser lithography, 3D nanoprinting (nanoscribe), or roll-to-roll embossing with digitally addressable rollers. Once a measurable pattern is created, conductor lines may be filled with metal and planarized on top. Generally, this is referred to as damascene processing, but the method of manufacturing can be any technique use to create a conductor within the patterned cavity. In some embodiments, the metal comprises an electroplating seed, such as titanium or copper.

Counterfeiting Countermeasures

Nano/microscale patterns at the bottom of resonator structures make the resonators difficult to reverse engineer and replicate. Sophisticated counterfeiters can utilize Computed Tomography (CT) X-ray or physical delayering and imaging and cataloging the dimensions. A buried pattern is small enough that it is below the spatial resolution of CT X-ray systems. Furthermore, low-Z materials (elements comprised of atoms with few protons that do not block X-rays) may be used and difficult to obtain good contrast in X-ray imaging. Layers may be thin enough that physical delayering is too demanding and time consuming to defeat the tag response signature via physical imaging and scanning. As a result, a design of a resonator according to the present disclosure makes it inherently resistant to even the most sophisticated of counterfeiting or copying techniques to obtain the tag.

Example: Digital Signatures (RFID)/MF Barcodes

Radio frequency (RF) barcodes using multiple frequency bands have been demonstrated as a proof of concept by Jalay and Robertson. Existing demonstrations interrogate multiple microstrip resonators and observe the S21 response and observe scattering and absorption to interrogate multiple barcodes at different frequencies. Frequency response is controlled via fine control of the width of the resonator lines. The advantage is that these resonators do not require a separate integrated circuit to provide a unique identifier like common RFID tags. Standard RFID tags can easily be replicated by introducing counterfeit integrated circuits with copied codes. MF barcodes, as previously described, can be easily replicated by physically measuring the microstrips and copying the structures to create a counterfeit MF signature. In contrast for example in one key aspect, the claimed invention is resilient against typical reverse engineering and copying techniques.

Referring now to FIGS. 2A and 2B, two views from a scanning electron microscope image of an exemplary MF Barcode are shown. As shown in FIG. 2A, the MF Barcode comprises a microstrip channel 210 and a set of imperfections 220 that affect the spectral response of the S21 scattering parameter. The set of imperfections 220 comprise nano-pattern blocks, manufactured using known nanoscale lithographic methods, which create a unique radio frequency signature in a cavity. Once the cavity is filled with a metal, the structure will comprise a radio frequency waveguide, as described above. S21 response may be measured by many of the methods known in the art, such as a spectrum analyzer. In some embodiments, more than one signal wave is propagated through the structure, allowing for greater accuracy in reading the spectral response.

Referring now to FIG. 2B, a set of imperfections 220 is shown at a higher zoom level. This set of imperfections 220 comprises imperfection #1 221 and imperfection #4 224. As discussed above, imperfections 221 and 224 comprise nano-patterned blocks. Additionally, the dimensions of imperfections 221 and 224 are functions of (a) the depth of microstrip channel 210 and (b) the resolution of the measuring device. For example, if the microstrip channel is 10 microns deep, and the resolution of the measuring device is 2 microns, then functionally, the height of an imperfection may be 0 microns, 2 microns, 4 microns, 6 microns, or 8 microns, thus giving five bits of measurement precision.

CONCLUSION

A number of embodiments of the present disclosure have been described. While this specification contains many specific implementation details, there should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Thus, particular embodiments of the subject matter have been described. Other embodiments are within the scope of the following claims. In some cases, the actions recited in can be performed in a different order and still achieve desirable results. It will therefore be understood that various modifications may be made without departing from the spirit and scope of the claimed disclosure.

What is claimed is:

1. A method of identifying an item or device and/or encoding data, the method comprising:
    transmitting electromagnetic waves in a controlled range of frequencies to a waveguide;
    impacting the waveguide with the electromagnetic waves;
    based upon the impact of the electromagnetic waves with the waveguide, patterning the electromagnetic waves into a unique signature that may be read by a receiver of the electromagnetic waves patterned into a signature;
    forming the signature based upon a spectral response of a scattering parameter caused by impacting the electromagnetic waves with the waveguide; and
    measuring a differentiation between the transmitted electromagnetic waves in the controlled range of frequencies and the electromagnetic waves patterned into the signature based upon impacting the waveguide.

2. The method of claim 1 wherein the impact of the electromagnetic waves comprises reflecting the electromagnetic waves off of at least one waveguide.

3. The method of claim 1 wherein the impact of the electromagnetic waves comprises passing the electromagnetic waves through at least one waveguide.

4. The method of claim 1, wherein the scattering parameter comprises absorption.

5. The method of claim 1, wherein the scattering parameter comprises transmission.

6. The method of claim 1, wherein the waveguide is generated via inkjet printing.

7. The method of claim 1, wherein the waveguide comprises a microstrip resonator.

8. An apparatus suitable for electromagnetic interrogation, the apparatus comprising:
    a waveguide comprising a conductor metal and surrounding dielectric, wherein the dielectric comprises one or more constrictions; and
    one or more engineered patterns of one or more blocks in one or more dimensions, which patterns provide unique electromagnetic signatures when an electromagnetic radiation wave propagates on or through a surface of the waveguide, and wherein intentional patterning of the surfaces of the waveguide changes an electromagnetic signal that is either transmitting through or being reflected from the waveguide.

9. The apparatus of claim 8, wherein the apparatus further comprises an antenna.

10. The apparatus of claim 8, wherein the waveguide is filled with a conductive metal.

11. The apparatus of claim 8, wherein the waveguide is planarized.

12. A method of identifying an item or device and/or encoding data, the method comprising:
    transmitting electromagnetic waves in a controlled range of frequencies to a waveguide, wherein the waveguide is generated via a direct-write serially alterable patterning technique that creates differing patterns;
    impacting the waveguide with the electromagnetic waves;
    based upon the impact of the electromagnetic waves with the waveguide, patterning the electromagnetic waves into a unique signature that may be read by a receiver of the electromagnetic waves patterned into a signature; and
    forming the signature based upon a spectral response of a scattering parameter caused by impacting the electromagnetic waves with the waveguide.

13. A method of identifying an item or device and/or encoding data, the method comprising:
- transmitting electromagnetic waves in a controlled range of frequencies to a waveguide, wherein the waveguide is generated via a Nanoscribe machine;
- impacting the waveguide with the electromagnetic waves;
- based upon the impact of the electromagnetic waves with the waveguide, patterning the electromagnetic waves into a unique signature that may be read by a receiver of the electromagnetic waves patterned into a signature; and
- forming the signature based upon a spectral response of a scattering parameter caused by impacting the electromagnetic waves with the waveguide.

14. A method of identifying an item or device and/or encoding data, the method comprising:
- transmitting electromagnetic waves in a controlled range of frequencies to a waveguide, wherein the controlled range of frequencies comprises between about 3 kHz-300 GHz;
- impacting the waveguide with the electromagnetic waves;
- based upon the impact of the electromagnetic waves with the waveguide, patterning the electromagnetic waves into a unique signature that may be read by a receiver of the electromagnetic waves patterned into a signature; and
- forming the signature based upon a spectral response of a scattering parameter caused by impacting the electromagnetic waves with the waveguide.

15. A method of identifying an item or device and/or encoding data, the method comprising:
- transmitting electromagnetic waves in a controlled range of frequencies to a waveguide, wherein the waveguide comprises a microstrip resonator comprising two ground planes and a dielectric substrate, and wherein the dielectric substrate comprises a plurality of non-constricted portions of the dielectric substrate, connected by one or more constricted portions of the dielectric substrate;
- impacting the waveguide with the electromagnetic waves;
- based upon the impact of the electromagnetic waves with the waveguide, patterning the electromagnetic waves into a unique signature that may be read by a receiver of the electromagnetic waves patterned into a signature; and
- forming the signature based upon a spectral response of a scattering parameter caused by impacting the electromagnetic waves with the waveguide.

16. A method of identifying an item or device and/or encoding data, the method comprising:
- transmitting electromagnetic waves in a controlled range of frequencies to a waveguide, wherein the waveguide comprises a microstrip resonator, and wherein the microstrip resonator comprises an antenna including an inner conductor placed between two ground planes;
- impacting the waveguide with the electromagnetic waves;
- based upon the impact of the electromagnetic waves with the waveguide, patterning the electromagnetic waves into a unique signature that may be read by a receiver of the electromagnetic waves patterned into a signature; and
- forming the signature based upon a spectral response of a scattering parameter caused by impacting the electromagnetic waves with the waveguide.

17. An apparatus suitable for electromagnetic interrogation, the apparatus comprising:
- a waveguide comprising a conductor metal and surrounding dielectric, wherein the conductor metal and surrounding dielectric comprise a microstrip resonator between 2 microns and 10 microns wide and between 10 microns and 1000 microns long; and
- one or more engineered patterns of one or more blocks in one or more dimensions, which patterns provide unique electromagnetic signatures when an electromagnetic radiation wave propagates on or through a surface of the waveguide, and wherein intentional patterning of the surfaces of the waveguide changes an electromagnetic signal that is either transmitting through or being reflected from said waveguide.

18. The apparatus of claim 17, wherein the apparatus further comprises an antenna.

19. The apparatus of claim 17, wherein the waveguide is filled with a conductive metal.

20. The apparatus of claim 17, wherein the waveguide is planarized.

* * * * *